US008384499B2

(12) United States Patent
Suzuki et al.

(10) Patent No.: US 8,384,499 B2
(45) Date of Patent: Feb. 26, 2013

(54) LEAKY CABLE HAVING AT LEAST ONE SLOT ROW FOR PROPAGATING ELECTROMAGNETIC WAVES THAT HAVE BEEN DIFFRACTED BACKWARDS

(75) Inventors: Fumio Suzuki, Sammu (JP); Kazuhiko Takano, Sakura (JP)

(73) Assignee: Fujikura Ltd., Tokyo (JP)

( * ) Notice: Subject to any disclaimer, the term of this patent is extended or adjusted under 35 U.S.C. 154(b) by 140 days.

(21) Appl. No.: 12/699,415

(22) Filed: Feb. 3, 2010

(65) Prior Publication Data
US 2010/0194500 A1    Aug. 5, 2010

(30) Foreign Application Priority Data

Feb. 5, 2009    (JP) .................. 2009-025197

(51) Int. Cl.
*H01Q 13/20*    (2006.01)
(52) U.S. Cl. ........................ 333/237; 343/770
(58) Field of Classification Search .................. 333/237; 343/770
See application file for complete search history.

(56) References Cited

U.S. PATENT DOCUMENTS

| 2,840,818 | A | * | 6/1958 | Reed et al. ............... 343/770 |
| 2,877,427 | A | * | 3/1959 | Butler ...................... 333/128 |
| 2,914,766 | A | * | 11/1959 | Butler ...................... 343/771 |
| 3,696,433 | A | * | 10/1972 | Killion et al. ............. 343/770 |
| 5,426,399 | A | * | 6/1995 | Matsubayashi et al. ..... 333/1 |

FOREIGN PATENT DOCUMENTS

| JP | 53-090742 A | 8/1978 |
| JP | 63-260302 A | 10/1988 |
| JP | 06-061735 A | 3/1994 |
| JP | 09-035547 A | 2/1997 |
| JP | 2002-330024 A | 11/2002 |
| JP | 2003-168330 A | 6/2003 |
| JP | 2003-229716 A | 8/2003 |
| JP | 2006286480 A | 10/2006 |
| JP | 2007-295396 A | 11/2007 |
| JP | 2008-278206 A | 11/2008 |

OTHER PUBLICATIONS

Kishimoto, T. et al. LCX Tsuushin Sisutemu (LCX Communications System), 1st ed., Korona-sha, Tokyo, Japan.
Fujisawa, K. et al. (Microwave Circuit), rev. Korona-sha, Tokyo, Japan, dated Apr. 15, 1960.

* cited by examiner

*Primary Examiner* — Benny Lee
(74) *Attorney, Agent, or Firm* — Sughrue Mion, PLLC

(57) ABSTRACT

A leaky cable with a central conductor, and an outer conductor having a rectangular cross section surrounding the central conductor. The outer conductor has a first and a second surface parallel to each other, and at least one slot row formed in at least one of the first and second surface. The slot row is formed in a first direction of the outer conductor and includes a plurality of slots each configured to form a leaky electromagnetic field. An insulator is disposed between the central conductor and the outer conductor. The width of the rectangular cross section in a direction parallel to the first and second surfaces is less than half of a wavelength of an electric signal transmitted through the leaky cable.

8 Claims, 12 Drawing Sheets

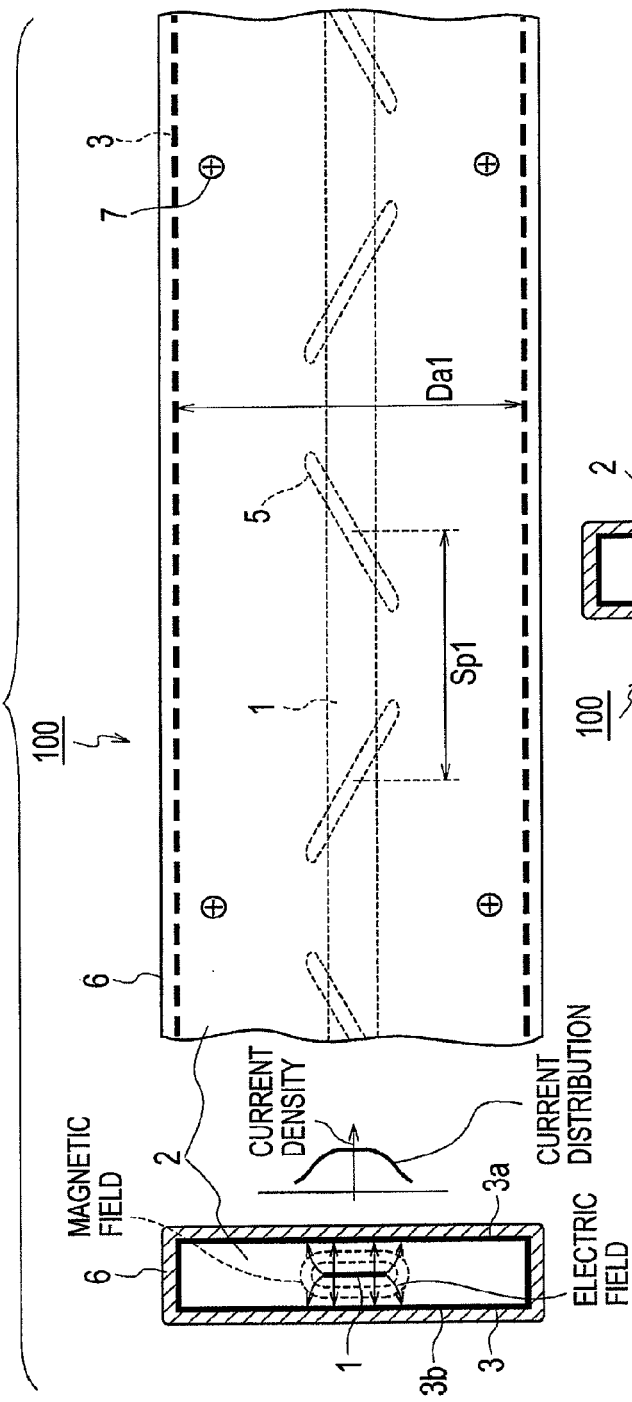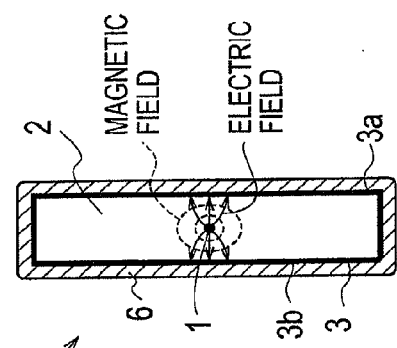

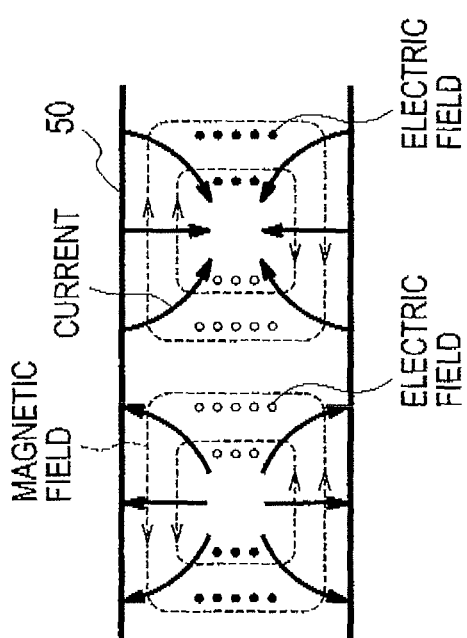
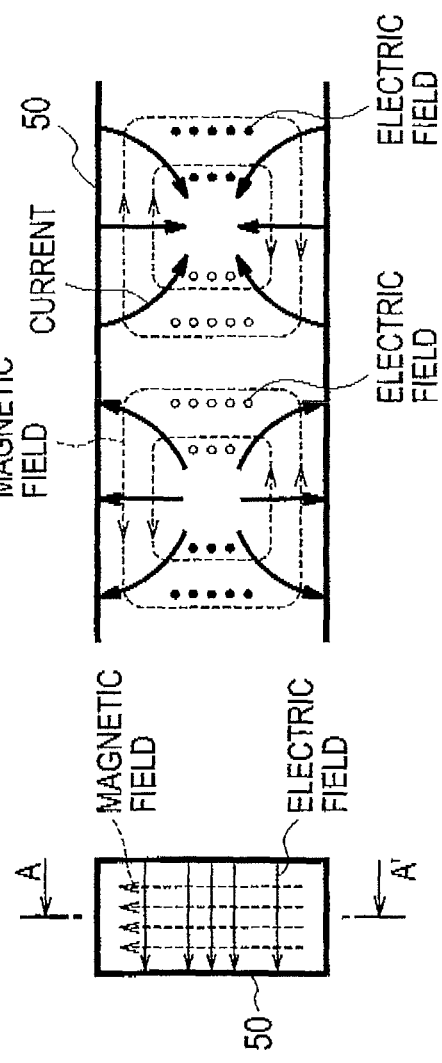
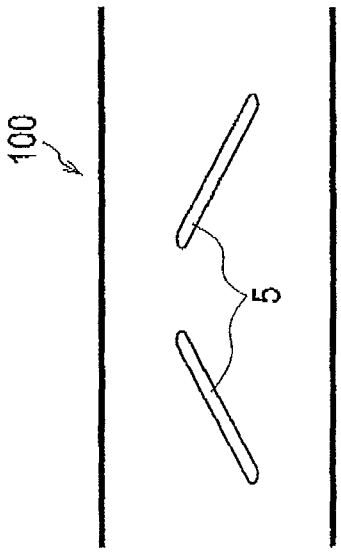
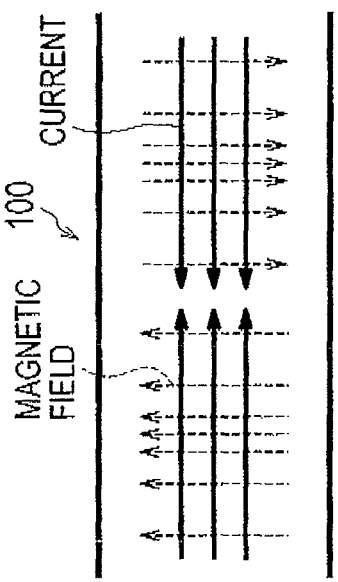
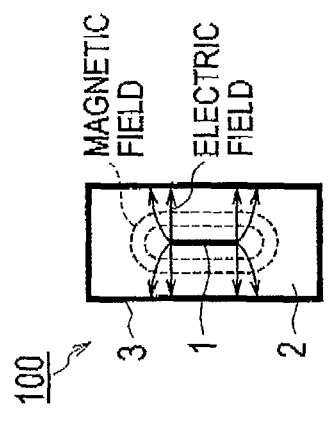

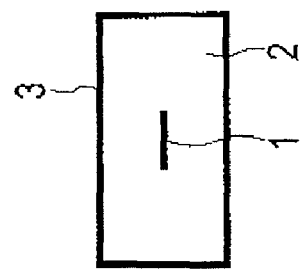
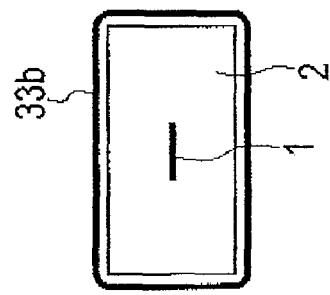
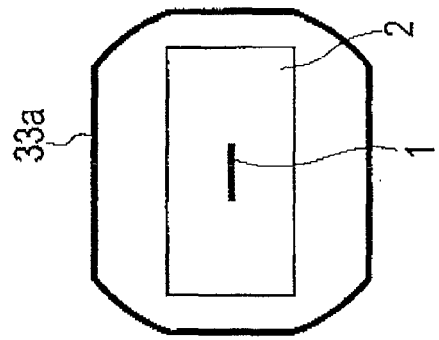
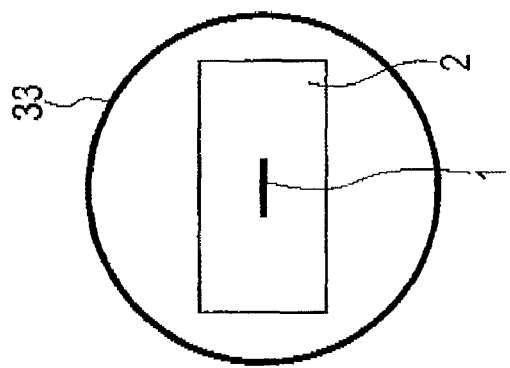

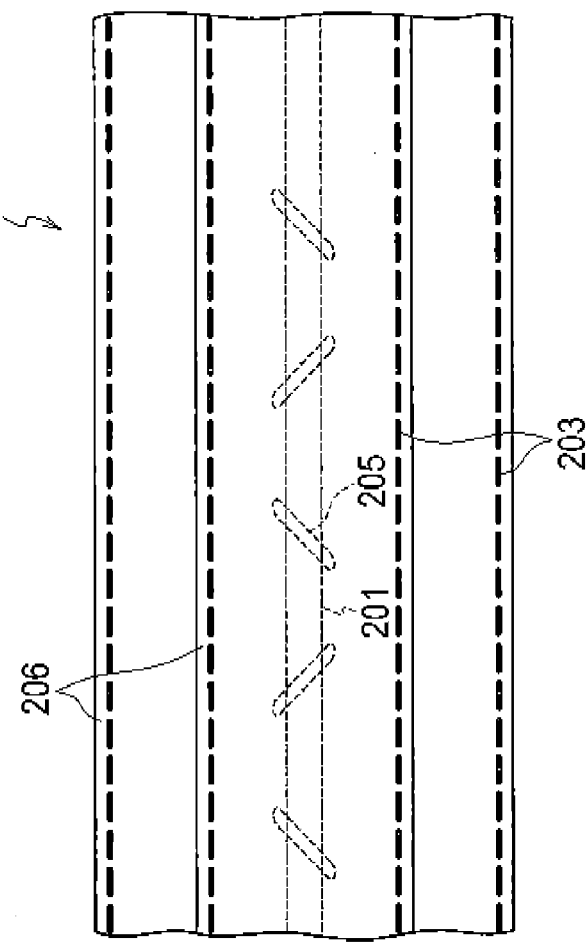
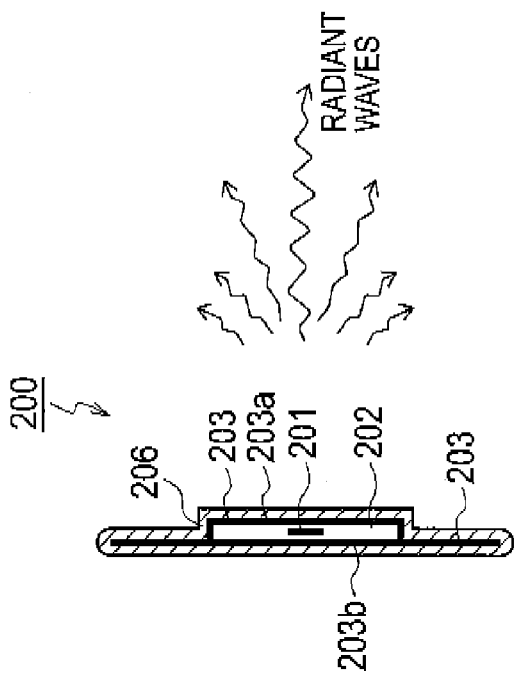

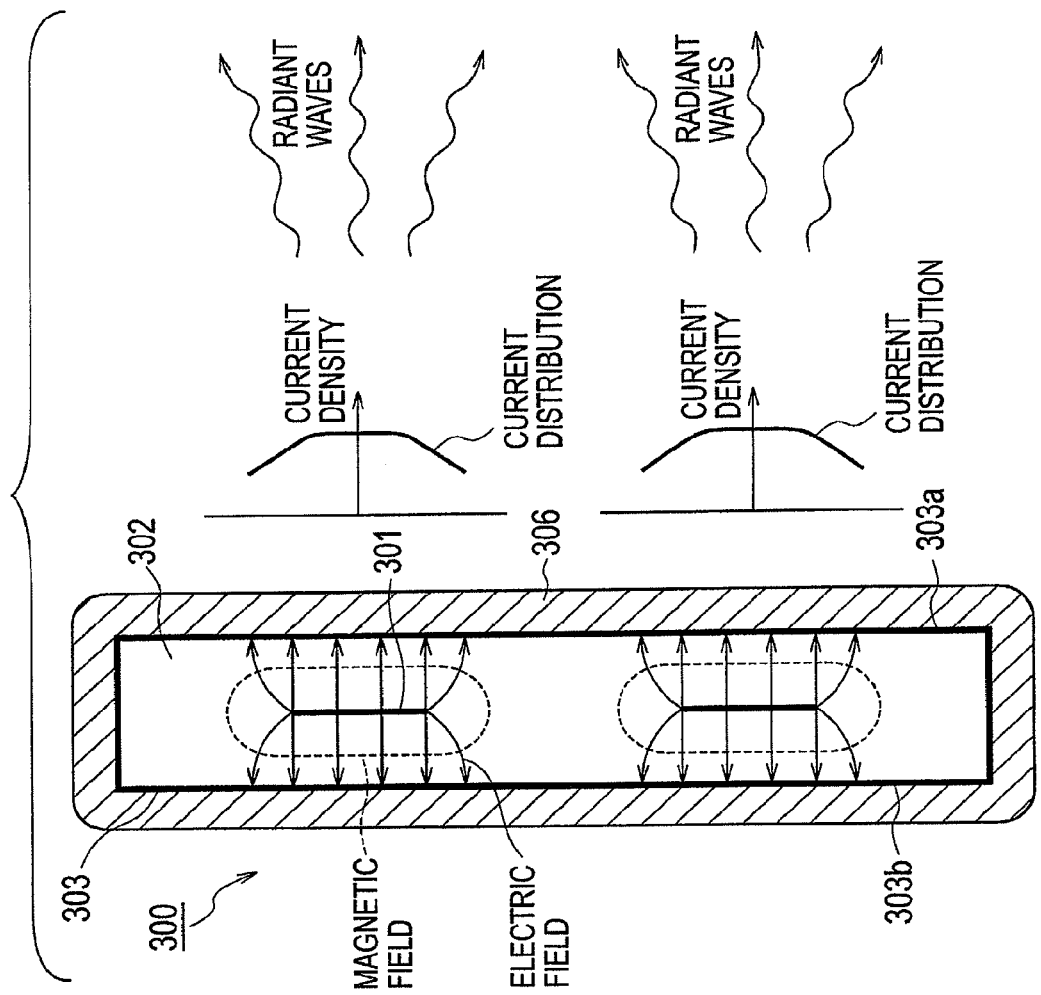
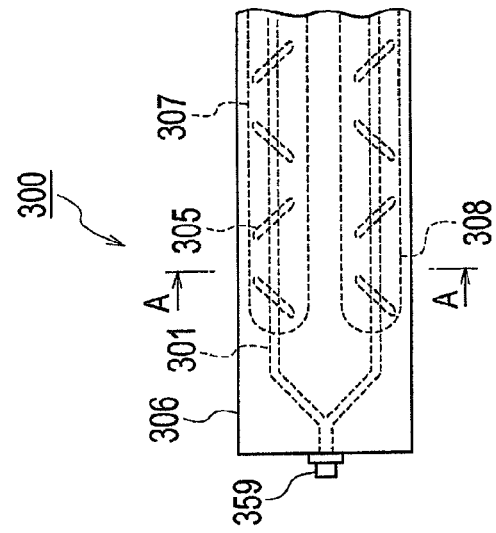

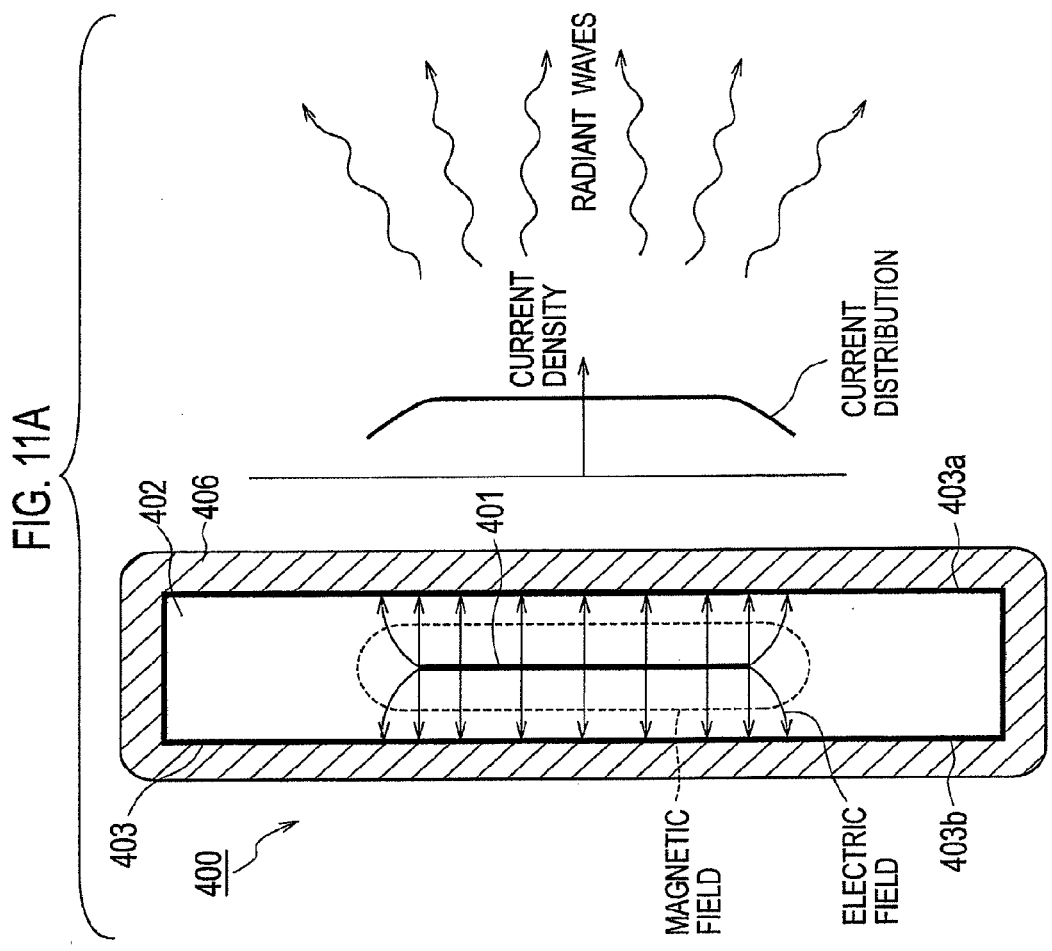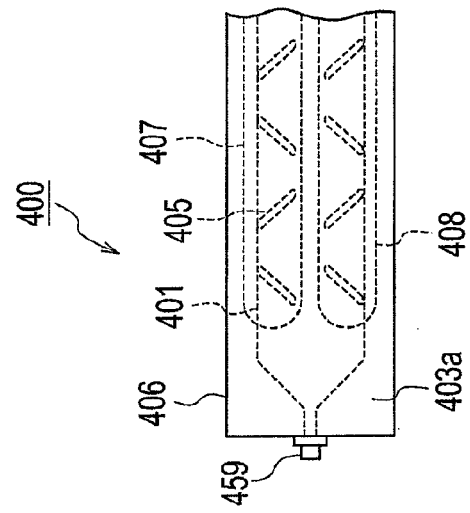

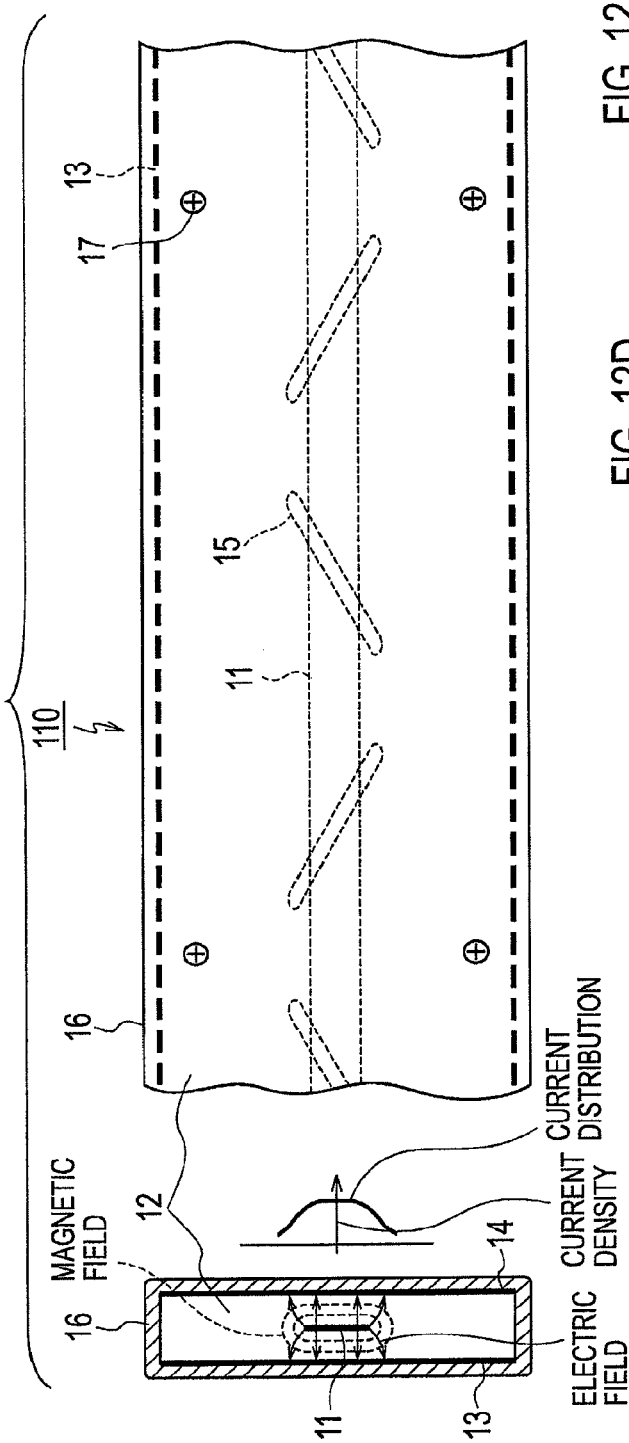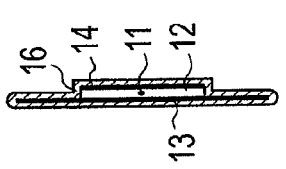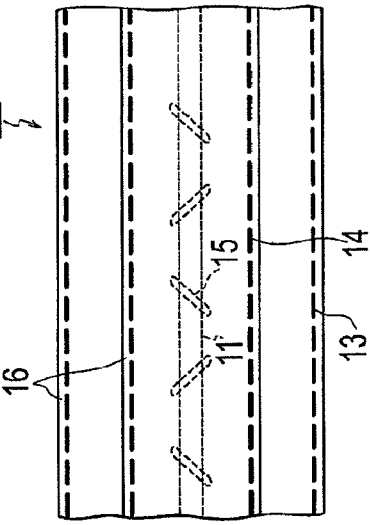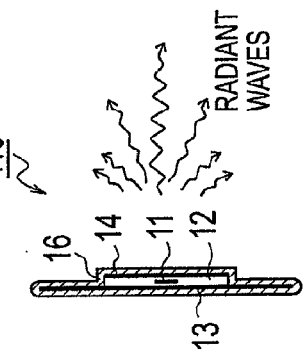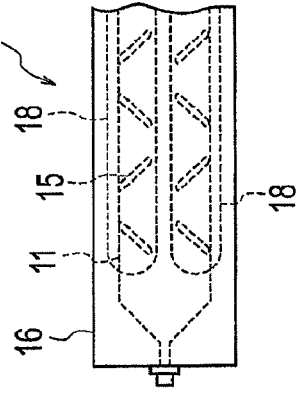

LEAKY CABLE HAVING AT LEAST ONE SLOT ROW FOR PROPAGATING ELECTROMAGNETIC WAVES THAT HAVE BEEN DIFFRACTED BACKWARDS

CROSS REFERENCE TO RELATED PATENT APPLICATION

This application claims priority from Japanese Patent Application No. 2009-025197 filed on Feb. 5, 2009, the entire contents of which are incorporated by reference herein.

BACKGROUND

1. Technical Field

Exemplary embodiments of the present disclosure relate to a leaky cable, and particularly to a high-quality leaky cable which has a simple configuration requiring no twist preventing mechanism and thereby inhibiting an increase in manufacturing costs, and which has such an appearance that gives an impression of being flat and not protruding from its circumference.

2. Description of the Related Art

In this description, the terms leaky transmission line and leaky cable refer to a transmission line configured to produce an electromagnetic field around the transmission line by causing part of the energy of an electric signal transmitted in the transmission line, to be propagated in a space outside of the structure of the transmission line. What is typical of this leaky transmission line or leaky cable is a leaky coaxial cable (LCX).

This leaky coaxial cable (LCX) includes an inner conductor, an insulator, an outer conductor and a sheath, and is used as a transmission/reception antenna for a radio communications system. For instance, such leaky coaxial cables are installed along the Shinkansen bullet train to allow radio communications between trains and operation centers. In addition, such leaky coaxial cables are installed in subway stations and underground shopping complexes to allow radio communications with communication partners such as the fire department and the police.

Structures and radiation theories of various leaky coaxial cables are discussed in Kishimoto, T. and Sasaki, S., *LCX Tsuushin Sisutemu* (*LCX Communications System*), 1st ed., Korona-sha, Tokyo, Japan (Non-Patent Document 1). A basic structure of the leaky coaxial cables is as follows. A leaky coaxial cable has electromagnetic wave leaking mechanisms in its outer conductor. The electromagnetic wave leaking mechanisms, called slots, are each formed into an oblong opening, and are formed in the outer conductor at periodic intervals in the lengthwise direction of the outer conductor. With this structure, the leaky coaxial cable is configured to radiate part of the energy of an electric signal, which is transmitted in the cable, outward in the form of electromagnetic waves.

When such a leaky coaxial cable is installed with the outer conductor including slots being twisted, the radiation direction changes, thereby wasting the electric power designated for the communication partner. Moreover, it is likely that a sufficient amount of electric power fails to reach the communication partner, so that the communications is disrupted. To solve this problem, for instance, Japanese Patent Application Laid-Open Publication No. 2003-229716 (Patent Document 1) discloses a leaky coaxial cable having a supporting protrusion in its sheath, on a side opposite to a side where slots are formed. The supporting protrusion inhibits the leaky coaxial cable from twisting, and thereby allows the slots to be in their original positions. Furthermore, Japanese Patent Application Laid-Open Publication No. 2003-168330 (Patent Document 2) has proposed a leaky coaxial cable provided with marker means, on its sheath, for indicating the locations of slots, to enable itself to be correctly placed with the radiation from each slot being directed to a targeted direction.

In addition, although electromagnetic waves are most strongly radiated in a direction in which each slot is opened, electromagnetic waves are also strongly radiated from the sides of the slot. This means that, if the communication partner is only in front of the slots, electromagnetic waves are radiated wastefully. To cope with this problem, Japanese Patent Application Laid-Open Publication No. 09-35547 (Patent Document 3) has proposed a leaky coaxial cable in which an outer conductor including slots is covered with another outer conductor including a slit, with the slit over the slots, so that the radiation of the slots will concentrate on a direction in which the slit is opened.

A leaky coaxial cable generally has a circular cross section and a large diameter. For instance, the leaky coaxial cable used for the Shinkansen bullet train is as large as approximately 50 mm in outer diameter. Installing leaky coaxial cables in places where they are noticeable, such as in buildings, particularly hotels, offices and houses, is aesthetically unfavorable because they give an impression of protruding from their circumference. From this view point, Japanese Patent Application Laid-Open Publication No. 63-260302 (Patent Document 4) has proposed a leaky coaxial cable having the following structures. Specifically, in a first structure, an inner conductor is placed almost in the middle between paired parallel outer conductors with an insulator being interposed between the inner conductor and each of the outer conductors, and multiple slots are arranged in at least one of the outer conductors at predetermined intervals. In a second structure, the outer conductors are electrically short-circuited at their widthwise end portions. In short, Patent Document 4 aims at introducing a radiation-type electromagnetic wave leaking cable which can be installed with an inconspicuous appearance because of its structure in which the distance between the outer conductors is smaller whereas the width of the outer conductors is larger.

When considering a waveguide and an antenna as a transmission line having no central conductor, from a viewpoint of using leaky coaxial cables as transmission/reception antennas, such equipment is disclosed in Japanese Patent Application Laid-Open Publication No. 2007-295396 (Patent Document 5). This document has proposed an antenna which has a structure in which: a waveguide is provided with slots; an electric power is supplied to the center potion of the waveguide; and the two halves of the waveguide are tilted with respect to each other.

In addition, Japanese Patent Application Laid-Open Publication No. 2002-330024 (Patent Document 6) has proposed an antenna that has an enhanced radiation orientation because of its configuration as follows. The antenna has a double-sided printed wiring board. Conductors are adhered to the respective two sides of the board. Slots are made in one side of the board, whereas power supplying strip lines are formed on the other side of the board. A conductor board is installed under the side on which the power supplying lines are formed, with an intervening distance of a quarter of the wavelength used.

Furthermore, Japanese Patent Application Laid-Open Publication No. 06-61735 (Patent Document 7) has proposed an antenna which has a configuration in which a printed wiring board having power supplying elements is placed under a metal plate having multiple radiation slots.

Despite its advantage, the technology disclosed in Non-patent Document 1 has various problems as follows. (1) The slots on the outer conductor need to be positioned exactly behind a supporting line, and complicated mechanisms are required to prevent the cable portion as the main body from being twisted with respect to the supporting line during the manufacturing process. (2) The leaky coaxial cable generally has a circular cross section and a large diameter. (3) The manufacturing process requires sophisticated and expensive manufacturing machines such as an extruder for insulators and an extruder for sheaths which are installed only in cable manufactures, and accordingly pushes up the manufacturing costs.

A technique of Patent Document 1 copes with the problem (1) disclosed in Non-patent Document 1 described above. However, the technique of Patent Document 1 requires a sophisticated technology for extruding sheaths, thereby increasing the processing costs, and also requires a larger amount of sheath material, thereby increasing the material costs. As a result, according to Patent Document 1, the manufacturing costs increase. In addition, according to Patent Document 2, the formation of the marker means, the concrete example of which is a line whose color is different from the color of the sheath, requires an additional manufacturing step and a sophisticated manufacturing technology. As a result, the processing costs increase.

A technique of Patent Document 3 copes with the wasteful radiation of electromagnetic waves. However, the technique of Patent Document 3 invites the following problems. First, a step of forming the insulator and a step of forming the sheath need to be added to the general steps of manufacturing the leaky coaxial cable, and this addition accordingly increases the processing costs. Secondly, the material for the insulator, the material for the outer conductor, and the material for the sheath increase the material costs. As a result, the manufacturing costs increase.

A technique of Patent Document 4 copes with the second problem disclosed in above-described Non-patent Document 1. However, the technique of Patent Document 4 invites problems as follow. First, in the first structure in which the paired outer conductors are not electrically short-circuited at their widthwise end portions, no restriction is imposed on where between the paired outer conductors and the inner conductor should be placed in the thickness direction of the leaky coaxial cable. When the inner conductor is not located in the middle in between the paired outer conductors, modes (transmission modes) occur in which the paired outer conductors are turned into transmission lines. These transmission modes cause part of electromagnetic waves to be leaked outward from the interstice between the outer conductors, and accordingly increase the attenuation of the electromagnetic waves. This makes the leaky coaxial cable incapable of radiating the electromagnetic waves stably.

Second, in the second structure in which the paired outer conductors are electrically short-circuited at their widthwise end portions, no restriction is imposed on the intervening distance between the paired outer conductors. When the intervening distance is too large, a higher-order transmission mode occurs. This makes it impossible to obtain a stable radiant electric power from the leaky coaxial cable. Moreover, no restriction is imposed on the widthwise dimension of the outer conductors. When the widthwise dimension of the outer conductors is too wide, a higher-order transmission mode occurs as well. This makes it impossible to obtain a stable radiant electric power from the leaky coaxial cable.

Leaky coaxial cables, as applications of the various antenna structures, disclosed in Patent Documents 5 to 7 have their own problems as follows. A leaky coaxial cable as an application of the waveguide structure disclosed in Patent Document 5 requires a wide space for installing the leaky coaxial cable because the waveguide structure is large in thickness. Furthermore, in general, the waveguide is made of a metal plate, and is accordingly unpliable. This makes it difficult to install the leaky coaxial cable. Moreover, a higher dimensional precision is required for the leaky coaxial cable. This requirement makes the leaky coaxial cable using the waveguide expensive.

The antenna disclosed in Patent Document 6 has the power supplying strip lines formed on a surface having no slot formation and therefore is advantageous in being formed as a thin, flat plate. Nevertheless, being of an antenna type, such a leaky coaxial cable is incapable of radiating electromagnetic waves to a wider space unlike general leaky coaxial cables or waveguides. Similarly, being of an antenna type, the antenna disclosed in Patent Document 7 is incapable of radiating electromagnetic waves to a wider space.

SUMMARY

An exemplary embodiment of the present disclosure has been made with the above-described circumstances taken into consideration. However, it is not required that an exemplary may solve any of the problems discussed above. According to an exemplary embodiment, a high-quality leaky cable is provided. The high quality leaky cable has a simple configuration requiring no twist preventing mechanism and thereby inhibiting an increase in manufacturing costs, and which has such a flat appearance that gives no protruding impression.

Another exemplary embodiment provides a leaky cable capable of: inhibiting electromagnetic waves from leaking wastefully; thus inhibiting the occurrence of any higher-order mode; and accordingly radiating electromagnetic waves stably.

Exemplary embodiments of the present disclosure provide these advantages by providing a leaky cable that includes an outer conductor surrounding a central conductor. A plurality of slots configured to form a leaky electromagnetic field are formed on at least one surface of the outer conductor.

BRIEF DESCRIPTION OF THE DRAWINGS

FIGS. 1A and 1B are diagrams of a leaky transmission line (leaky cable) according to a first embodiment of the present invention.

FIGS. 2A and 2B show distributions of electromagnetic field of a waveguide.

FIGS. 3A and 3B show distributions of electromagnetic field of the leaky transmission line.

FIG. 3C shows positions of slots provided in the leaky transmission line.

FIGS. 6A to 6D show a leaky transmission line made by a manufacturing method according to the first embodiment.

FIGS. 9A and 9B show a leaky transmission line according to a second embodiment of the present invention.

FIGS. 10A and 10B show a leaky transmission line according to a third embodiment of the present invention.

FIGS. 11A and 11B show a leaky transmission line according to a fourth embodiment of the present invention.

FIGS. 12A to 12E show a leaky transmission line according to a fifth embodiment of the present invention.

DETAILED DESCRIPTION

Figure 4:
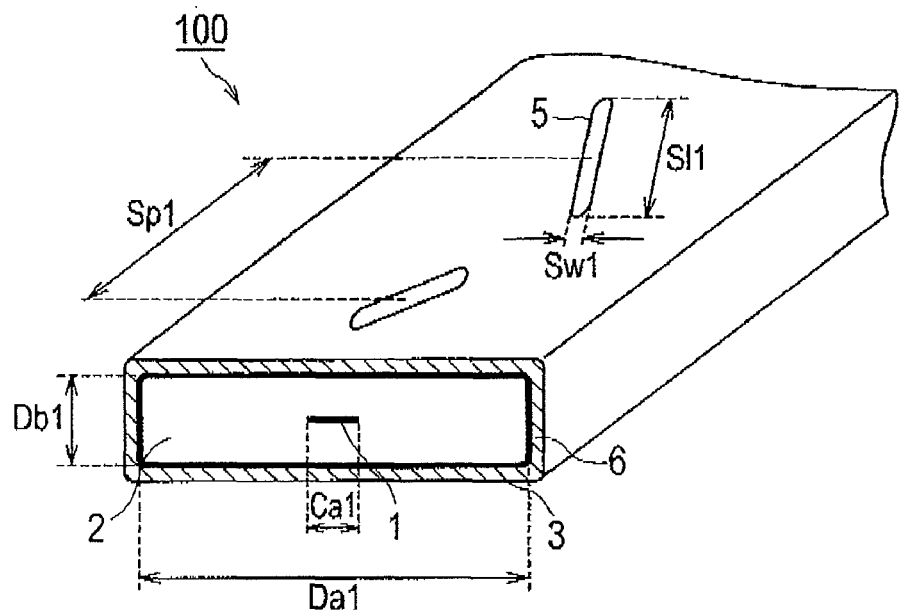
FIG. 4 is a perspective view of the leaky transmission line according to the first embodiment.

Referring to the drawings, where like features are denoted by the same reference number, detailed descriptions will be hereinbelow provided sequentially for a first embodiment, a second embodiment, a third embodiment, a fourth embodiment and a fifth embodiment as exemplary embodiments of a leaky cable according to the present disclosure.

First Embodiment

FIG. 1A is a block diagram of a leaky transmission line (leaky cable) 100 according to a first embodiment of the present invention. The left part of FIG. 1A shows a drawing of a transverse cross section of the leaky transmission line 100 taken perpendicular to the lengthwise direction of the leaky transmission line 100, and shows electric fields and magnetic fields by thin solid lines and dashed lines, respectively. The right part of FIG. 1A shows a drawing of a longitudinal cross section of the leaky transmission line taken parallel to the lengthwise direction of the leaky transmission line 100. The middle part of FIG. 1A shows a distribution of electric current flowing in an outer conductor 3. FIGS. 2A and 2B show distributions of electromagnetic field of a waveguide 50. FIGS. 3A, 3B and 3C show distributions of electromagnetic field of the leaky transmission line 100. FIG. 4 shows a perspective view of the leaky transmission line 100.

As shown in FIG. 1A, the leaky transmission line (leaky cable) 100 according to this embodiment includes: a central conductor 1; an outer conductor 3 surrounding the central conductor 1 and having a rectangular cross section; an insulator 2 disposed between the central conductor 1 and the outer conductor 3; and a sheath 6 covering the outer conductor 3. The outer conductor 3 is provided with a row of multiple slots 5 for forming leaky electromagnetic field, in at least one of surface (first surface) 3a and surface (second surface) 3b which include the respective long sides of the rectangular cross section.

The slots 5 are provided to either one or both of the surfaces 3a and 3b which include the respective long sides of the rectangular cross section at periodic intervals (at slot intervals Sp1). FIG. 1A exemplifies a zigzag slot arrangement pattern which is generally used for leaky coaxial cables (LCXs). However, the slot arrangement pattern is not limited to such a pattern. Any publicly-known electromagnetic field leaking mechanism which is used for leaky coaxial cables (LCXs) may be used. In addition, although described as being formed into a rectangle, the cross section of the central conductor 1 is not limited to a rectangle, and may be formed into a polygon or a circle. A circle configuration is illustrated in FIG. 1B. Nevertheless, as inferable from the following explanation, the rectangular cross-sectional structure is preferable for the transmission characteristic of an electric signal and the radiation characteristic of an electromagnetic wave from a viewpoint of the distributions of electromagnetic field.

Furthermore, in the leaky transmission line 100 according to this embodiment, a restriction is imposed on the geometric dimension of the outer conductor 3 in a way that the length (Da1) of the long sides of the rectangular cross section of the outer conductor 3 should be less than a half of the wavelength λ of a transmitted electric signal. Referring to FIGS. 2A, 2B, and 3A to 3C, descriptions will be provided for the reason why this kind of restriction may be imposed on the geometric dimension of the outer conductor 3. FIGS. 2A and 2B show the distributions of electromagnetic field of the waveguide 50 in a transverse cross section of the waveguide 50 and the longitudinal cross section thereof, respectively. In addition, FIGS. 3A and 3B show the distributions of electromagnetic field of the leaky transmission line 100 in a transverse cross section of the leaky transmission line 100 and the longitudinal cross section thereof. FIG. 3C shows correspondences between the distributions of electromagnetic field and the positions of the slots 5. In these figures, electric fields, magnetic fields, and electric currents are indicated by thin solid lines, dashed lines, and thick solid lines, respectively. In FIG. 2B, solid and hollow circles indicate electric fields perpendicular to the longitudinal cross section A-A' as shown in FIG. 2A, and these have opposite directions to each other.

The leaky transmission line 100 according to this embodiment adopts a dual waveguide system which is configured by including two conductors, namely the central conductor 1 and the outer conductor 3. For this reason, a transmitted electric signal can use any frequency in a range of a low frequency to a high frequency. The leaky transmission line 100 transmits an electric signal basically in the transverse-electromagnetic (TEM) mode.

The distributions of electromagnetic field of the leaky transmission line 100 in the TEM mode are as shown by the transverse cross section in FIG. 3A and the longitudinal cross section in FIG. 3B. In the surface of the perfect conductor, an electric current flows in directions at a right angle to the magnetic field in accordance with the Gauss law. For this reason, as shown in FIG. 3B, the electric current flows in parallel to the lengthwise directions of the leaky transmission line 100. The following point should be noted. On the basis of inference from the distributions of electromagnetic field, one may consider that: as shown in FIG. 1A, the distribution of electric current flowing in the surfaces 3a and 3b of the outer conductor 3 has the highest electric current density in an area where the outer conductor 3 faces the central conductor 1; and the electric current density becomes progressively lower toward the ends in the other area where the outer conductor 3 does not face (or overlap with) the central conductor 1.

The slots 5 of the outer conductor 3 are made in the respective locations as shown in FIG. 1 and FIG. 3C. In the neighborhood of each slot 5, the electric current, which flows in the outer conductor 3, flows in the direction in which the slot 5 inclines with respect to the lengthwise direction. This disturbance in the distribution of electric current causes radiation, to thereby emit electromagnetic waves from the leaky transmission line 100.

As far as the shape is concerned, the outer conductor 3 of the leaky transmission line 100 according to this embodiment coincides in shape with the rectangular waveguide. The transmission of an electric signal in the rectangular waveguide is usually achieved by use of the TE (Transverse Electric) mode. The distribution of electromagnetic field of the rectangular waveguide in the TE01 mode, which is a dominant mode for the rectangular waveguide, is illustrated in the transverse cross section shown in FIG. 2A and the longitudinal cross section shown in FIG. 2B. In the TE01 mode, the electric current exhibits such distribution that the electric current flows between the lengthwise axis of the rectangular waveguide and each of the ends of the rectangular waveguide.

Accordingly, the distribution of electric current is disturbed less in the neighborhood of each slot 5. Electromagnetic waves are emitted less in the TE01 mode. In other words, while the transmission of an electrical signal in the leaky transmission line 100 includes the TE01 mode, the electric current flows in each surface of the outer conductor 3 in such a complicated manner that the radiation of the electromagnetic waves from each slot 5 is disturbed. This makes the distribution of radiant power uneven, and accordingly reduces the radiant efficiency of the electromagnetic waves.

On the other hand, in the TE01 mode, the cutoff wavelength of the rectangular waveguide is expressed with $$\lambda c = 2 \cdot Da1$$

where Da1 denotes the length of a long side of the rectangular cross section of the outer conductor 3 (see Fujisawa, K. "§5.2 Houkei Douko Kan (Rectangular Waveguide)," in *Maikuroha Kairo (Microwave Circuit)*, rev., Korona-sha, Tokyo, Japan). (*Maikuroha Kairo (Microwave Circuit)* will be referred to as "Non-patent Document 2.") The following points should be noted. In addition to the TE01 mode, various TE and transverse magnetic (TM) transmission modes such as TE11 mode, TE20 mode, TM11 mode and the like occur in the rectangular waveguide. Among all the transmission modes, the TE01 mode is the dominant lowest-order mode. The cutoff wavelength of the rectangular waveguide in any higher-order TE modes or any TM mode takes a smaller value than the cutoff wavelength of the rectangular wavelength in the TE01 mode.

Accordingly, to prevent any TE and TM modes except of the TE01 mode from occurring in the leaky transmission line 100, the length Da1 of the long sides of the rectangular cross section of the outer conductor 3 should be set less than a half of the wavelength λg of a transmitted electric signal.

To put it specifically, the wavelength λg in the leaky transmission line 100 is expressed with Expression (1)

$$\lambda g = (C0/f)/(\in r)^{1/2} = \lambda 0/(\in r)^{1/2} \quad (1)$$

where C0 denotes a light speed in the vacuum, f denotes the frequency of a transmitted electric signal, λ0 denotes the wavelength of the transmitted electric signal in the vacuum, and ∈r denotes the dielectric constant of the insulator 2. In short, when the length Da1 of the long sides of the rectangular cross section of the outer conductor 3 is set less than a half of the wavelength λg of the transmitted electric signal (namely Da1<λg/2), the TE and TM modes except of the TE01 mode can be cut off.

Next, referring to FIGS. 5A, 5B and 6A to 6D, descriptions will be provided for a method of manufacturing the leaky transmission line 100 according to this embodiment. These figures are explanatory diagrams each for explaining the method of manufacturing the leaky transmission line 100.

Figure 5A:
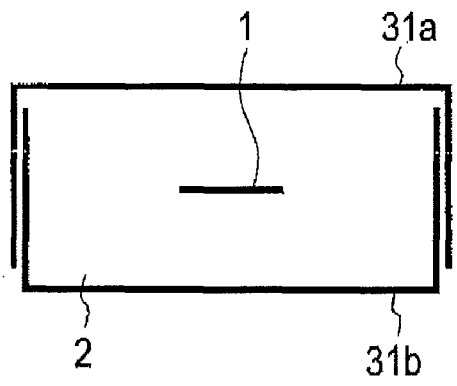
FIG. 5A shows a leaky transmission line made by a manufacturing method according to the first embodiment.

First of all, the method of manufacturing the leaky transmission line 100 as shown in FIG. 5A is that for forming the outer conductor 3 by use of two copper members 31a, 31b. To put it specifically, the central conductor 1 is covered with the insulator 2 and is wrapped with one of the copper members 31a, 31b having concave cross sections, and is subsequently wrapped with the other of the copper members 31a, 31b additionally. Thereafter, the copper members 31a, 31b are electrically connected together by causing the end portions of one copper member to respectively overlap the end portions of the other copper member.

Figure 5B:
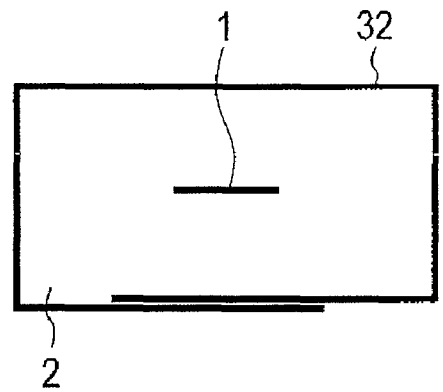
FIG. 5B shows a leaky transmission line made by a manufacturing method according to the first embodiment.

The method of manufacturing the leaky transmission line 100 as shown in FIG. 5B is that for forming the outer conductor 3 by use of a single copper member 32. To put it concretely, the central conductor 1 covered with the insulator 2 is wrapped with the copper member 32. Thereafter, the end portions of the copper member 32 are electrically connected together by causing one end portion of the copper member 32 to overlap the other end portion of the copper member 32. Note that the manufacturing methods as respectively shown in FIGS. 5A and 5B may use electric welding, laser welding or the like for the purpose of securing the electric connection.

The method of manufacturing the leaky transmission line 100 as shown in FIGS. 6A to 6D is that for forming the outer conductor 3 (FIG. 6D) by forming and drawing a copper pipe 33 (FIG. 6A). To put it specifically, the copper pipe 33, which is large enough for the central conductor 1 covered with the insulator 2 to be inserted therein, is prepared (see FIG. 6A). Subsequently, the resultant product undergoes the forming step in which a substantially octagon copper tube 33a is temporarily formed (see FIG. 6B) and the drawing step in which a substantially rectangular copper tube 33b is temporarily formed (see FIG. 6C). Thereby, the leaky transmission line 100 is manufactured (see FIG. 6D).

Figure 7A:
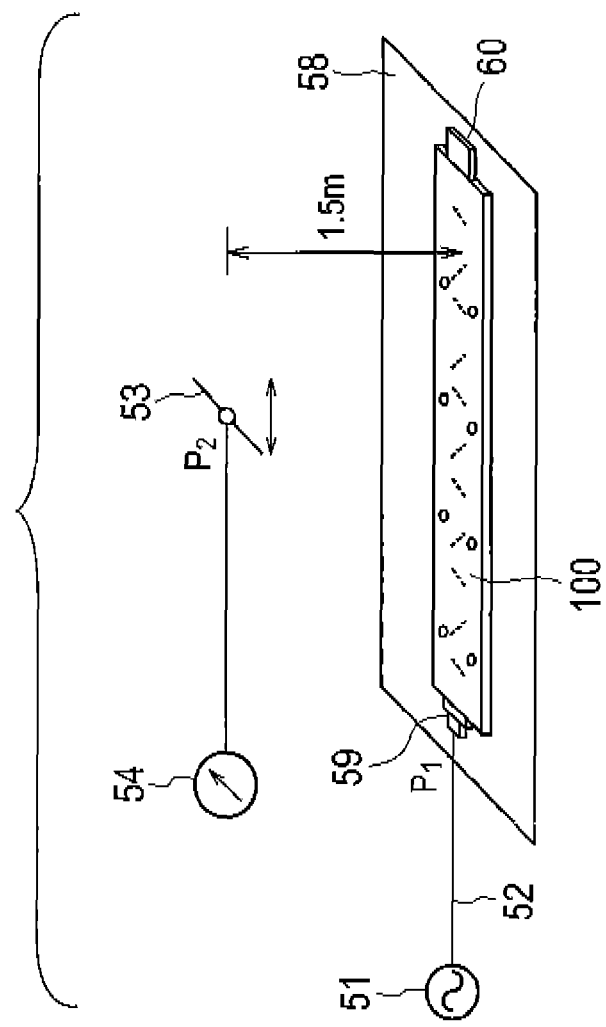
FIG. 7A shows how to measure the amount of radiation leakage from the leaky transmission line according to the first embodiment.

Next, the usefulness of the leaky transmission line 100 according to this embodiment will be described with referring FIGS. 4, 7A and 7B. FIG. 7A shows how to measure the amount of radiation leakage from the leaky transmission line 100 and the result of the measurement. The leaky transmission line 100 to be used for the measurement was produced experimentally as follows. A piece of copper tape with a width Ca1 (see FIG. 4) of 3 mm and with a thickness of 0.1 mm was used as the central conductor 1 (FIG. 4). This piece of copper tape (constituting the central conductor 1) was interposed between two pieces of polyethylene (constituting the insulator 2) each with a thickness of 2 mm and with a width Da1 (see FIG. 4) of 19 mm. Subsequently, another piece of copper tape (constituting the outer conductor 3) with a thickness of 0.2 mm was wound on, and thus adhered to, the periphery of the resultant product. The combined members were heated and thus welded together so that the combined members would not separate from each other. Thereafter, the resultant combined members were covered with the sheath 6 to protect the outer conductor 3.

The leaky transmission line 100 experimentally produced was designed with a characteristic impedance of 50Ω. In addition, the width Ca1 (see FIG. 4) of the central conductor 1, the thickness of the central conductor 1, the thickness Db1 of the insulator 2 and the like were found by applying the impedance of 50Ω and the dielectric constant (2.3 in the case of polyethylene) of the insulator 2 to the calculated value of the characteristic impedance of a balanced strip line which was disclosed in Non-patent Document 2 (see "§4.3 sutorippu senro (Strip Line)").

Note that the slots 5 each with a width Sw1 (see FIG. 4) of 2 mm and with a length Sl1 (see FIG. 4) of 15 mm formed in the outer conductor 3 at periodic intervals (at slot intervals Sp1 (see FIG. 4)) were set in the respective locations facing the central conductor 1, for the purpose of making the radiation from each slot efficient. In addition, the leaky transmission line 100 experimentally produced was 3 m in length. The entire leaky transmission line 100 was fixed securely by screwing the leaky transmission line 100 at its end portions positioned along a direction perpendicular to the lengthwise direction (see screws denoted by 7 in FIG. 1A).

The system for measuring the amount of radiation leakage was as shown in FIG. 7A. A metal plate 58 was placed on a floor. The leaky transmission line 100 experimentally produced was mounted on the metal plate 58. A connector 59 was attached to the input terminal of the leaky transmission line 100. In addition, a termination 60 with an impedance of 50Ω was attached to the opposite end of the leaky transmission line 100 (i.e., designated by the arrow). Thereby, the reflection was prevented. A standard dipole antenna 53 for a frequency of 2.4 GHz was installed on the leaky radiant waves receiving side, at a position 1.5 m away from the leaky transmission line 100.

An electric signal with a frequency of 2.4 GHz was supplied from an oscillator 51 to the connector 59 of the leaky transmission line 100 via a power supply cord 52. Thus, the leaky radiant waves from the leaky transmission line 100 were measured by use of a power meter 54 through the dipole antenna 53. Note that the dipole antenna 53 was placed at a right angle to the lengthwise direction of the leaky transmission line 100 so that the dipole antenna could receive polarized waves which are at a right angle to the lengthwise axis of the leaky transmission line 100.

Thereafter, the coupling loss was measured while moving the dipole antenna 53 by 3 m in the lengthwise direction of the leaky transmission line 100. The coupling loss L is a ratio of the power P1 inputted into the leaky transmission line 100 to the power P2 received by the dipole antenna 53. The coupling loss is expressed with (Expression 2)

$$L=10 \log(P1/P2)[dB]. \quad (2)$$

Figure 7B:
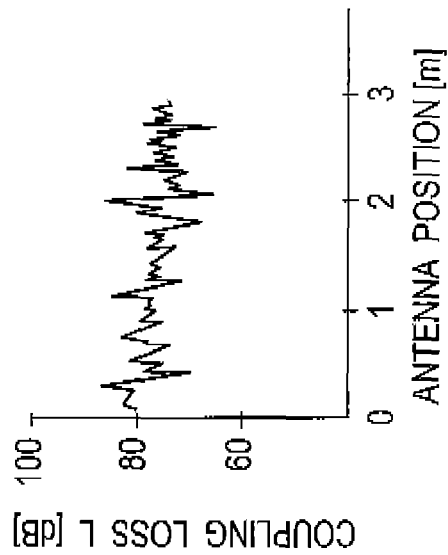
FIG. 7B shows a result in the measurement as shown in FIG. 7A.

FIG. 7B shows the result of measurement of the coupling loss L [dB] vs the antenna position [mm]. The coupling loss of approximately 8 dB was observed along the leaky transmission line 100. The leakage of radiant waves was confirmed.

The foregoing descriptions have been provided for the measurement of the amount of radiation leakage from the leaky transmission line 100, namely the transmission characteristic of the leaky transmission line 100. Alternative aspects described herein are not necessarily depicted in the drawings, but are easily understood based on the drawings. The reception characteristic of the leaky transmission line 100 can also be measured by replacing the transmission side with the reception side, in the measurement system shown in FIG. 7A. To put it concretely, the system for measuring the reception characteristic of the leaky transmission line 100 is configured such that: an electric signal with a frequency of 2.4 GHz is supplied from the oscillator 51 to the dipole antenna 53; and the received signal from the leaky transmission line 100 is measured by use of the power meter 54 through the connector 59 of the leaky transmission line 100. A measurement result, which is almost similar to the measurement result as shown in FIG. 7B, can be obtained for this reception characteristic.

Thereafter, by measuring the coupling loss, a check was made on whether or not it was effective that the length Da1 of the long sides of the rectangular cross section of the outer conductor 3 was set less than a half of the wavelength λg of the transmitted electric signal. The wavelength λg of the electric signal transmitted in the leaky transmission line 100 was 82.4 mm because: the frequency f of the transmitted electric signal was set at 2.4 GHz; and the dielectric constant ∈r of the insulator 2 was set at 2.3. For this reason, the length Da1 of the long sides of the rectangular cross section of the outer conductor 3 needed to be less than λg/2=41.2 mm.

Using the system for measuring the amount of radiation leakage as shown in FIG. 7A, measurements were conducted for the coupling loss which occurred in a case where the length Da1 of the long sides was 50 mm which was longer than λg/2 and for the coupling loss which occurred in a case where the length Da1 of the long sides was 30 mm which was shorter than λg/2. As a result, it was observed that: the coupling loss, which occurred in the case where Da1 was 50 mm which was longer than λg/2, was 25 dB; and the coupling loss, which occurred in the case where Da1 was 30 mm which was shorter than λg/2, was less than 15 dB. Therefore, it was able to be confirmed that, when the length Da1 of the long sides of the rectangular cross section of the outer conductor 3 was set less than a half of the wavelength λg of the transmitted electric signal (Da1<λg/2), the electromagnetic waves were radiated stably.

Figure 8A:
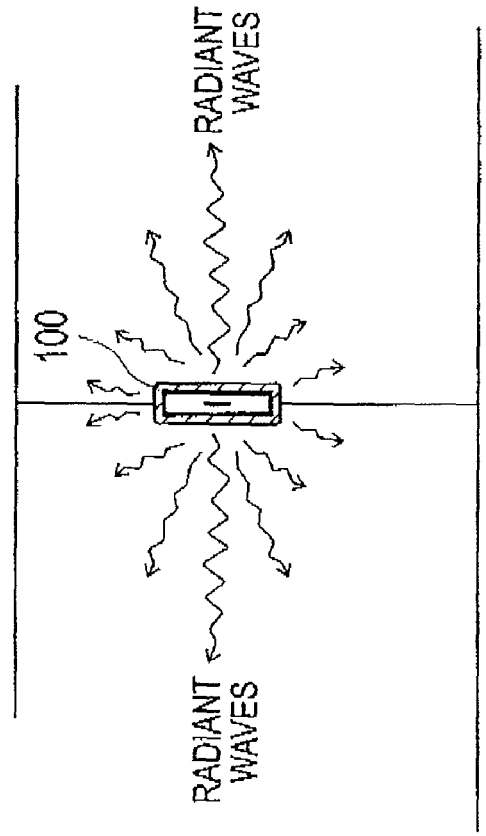
FIGS. 8A and 8B show applications of the leaky transmission line according to the first embodiment.
Figure 8B:
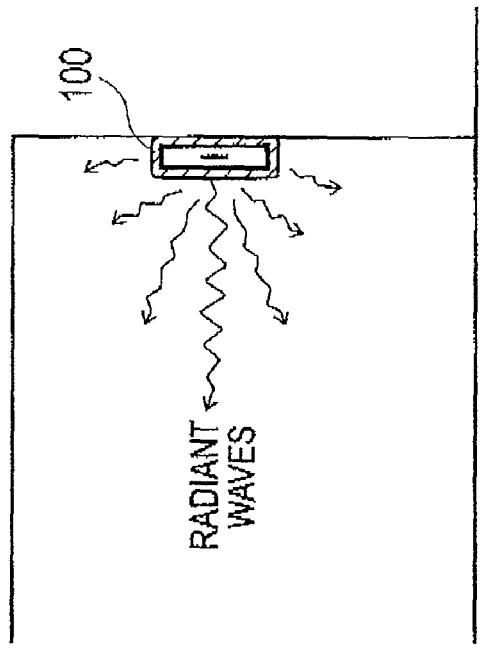

Next, exemplary applications of the leaky transmission line 100 according to this embodiment will be described with referring FIGS. 8A and 8B. As shown in FIGS. 8A and 8B, the leaky transmission line 100 is mainly installed in a location where no ground waves can be received, such as a tunnel, an underground shopping complex, or a service spot.

As described above, the slots 5 are provided to either or both of the surfaces 3a and 3b which include the respective long sides of the rectangular cross section of the outer conductor 3. The slots 5 impart a radiation orientation to the surface having the slots 5.

As shown in FIG. 8A, the configuration in which the slots 5 are provided to only one of the surfaces 3a and 3b of the outer conductor 3 is useful when the leaky transmission line 100 is mounted on an inner wall of a building, a tunnel or the like to radiate electromagnetic waves inward therefrom.

Alternatively, as shown in FIG. 8B, the configuration in which the slots 5 are provided to both of the surfaces 3a and 3b of the outer conductor 3 is useful when the leaky transmission line 100 is mounted on a partition wall in a building to radiate electromagnetic waves from both sides of the partition wall.

As described above, the leaky transmission line 100 (the leaky cable) according to this embodiment includes: the central conductor 1 having a rectangular cross section; the outer conductor 3 surrounding the central conductor 1 and having a rectangular cross section, the outer conductor 3 having a row of the multiple slots 5 for forming leaky electromagnetic field in at least one of the surfaces 3a and 3b which include the respective long sides of the rectangle; and the insulator 2 disposed between the central conductor 1 and the outer conductor 3. In the leaky transmission line 100, the length Da1 of the long sides of the rectangular cross section of the outer conductor 3 is set less than a half of the wavelength λg of the transmitted electric signal. This makes it possible to cut off any TE and TM modes except of the TE01 mode, and thus to make the distribution of radiant power even. Accordingly, the radiant efficiency of the electromagnetic waves can be enhanced.

Furthermore, having a rectangle cross section, the leaky transmission line 100 according to this embodiment can have a decreased thickness. For instance, although the leaky transmission line experimentally produced was already approximately 6 mm in thickness, it is possible to further reduce the thickness of the leaky transmission line 100 according to this embodiment by reducing the thickness of the insulator, by narrowing the width of the central conductor 1, or by decreasing the dielectric constant of the insulator 2. Moreover, because the structure of the leaky transmission line 100 according to this embodiment is made of the pieces of conductor (metal) tape and the insulator which overlap one another, the manufacturing method needs no expensive manufacturing machine such as an extruder. This makes it possible to inhibit the increase in the manufacturing costs.

Further, the leaky transmission line 100 according to this embodiment has the structure in which: its cross section is formed into a rectangle; and the slots 5 are formed in one of the flat surfaces of the outer conductor 3. For this reason, the surface including the slots 5 do not twist. Additionally, because the leaky transmission line 100 according to this embodiment is formed into a flat plate, it is possible to fix the locations of the slots 5 very easily. Furthermore, unlike the conventional leaky coaxial cable having a circular cross section, the leaky transmission line 100 has a simpler configuration which requires no complicated mechanism or additional step for preventing the twist. For this reason, it is possible to inhibit an increase in the manufacturing costs.

Second Embodiment

Next, descriptions will be provided for a leaky transmission line (leaky cable) according to a second embodiment of the present invention. FIGS. 9A and 9B show a leaky transmission line 200 according to the second embodiment of the present invention. FIG. 9A shows a drawing of a transverse cross section of the leaky transmission line 200 taken perpendicular to the lengthwise direction of the leaky transmission line 200. FIG. 9B shows a drawing of a longitudinal cross section of the leaky transmission line 200 taken in parallel to the lengthwise direction of the leaky transmission line 200. Note that the leaky transmission line 200 according to this embodiment is configured to radiate electromagnetic waves from only one side on the widthwise axis of the leaky transmission line 200 (namely, to only the right on the drawing as shown in FIG. 9A).

As shown in FIGS. 9A and 9B, the leaky transmission line 200 (FIG. 9A) includes: a central conductor 201 having a rectangular cross section; an outer conductor 203 surrounding the central conductor 201 and having a rectangular cross section for an electric signal transmission line; an insulator 202 (FIG. 9A) disposed between the central conductor 201 and the outer conductor 203; and a sheath 206 covering the outer conductor 203. The outer conductor 203 is provided with a row of multiple slots 205 (FIG. 9A) for forming a leaky electromagnetic field, in one of surface (first surface) 203a (FIG. 9A) and surface (second surface) 203b (FIG. 9B) which include the respective long sides of the rectangular cross section. In the embodiment as shown in FIGS. 9A and 9B, the row of multiple slots 205 is provided in the surface 203a.

In this respect, the width of the other surface of the outer conductor 203 (i.e. surface 203b), which includes no row of slots, is set longer than the width of the surface of the outer conductor 203 (i.e. surface 203a), which includes the row of slots. When the width of the other surface of the outer conductor 203, which includes no row of slots, is set longer in this manner, it is possible to inhibit part of electromagnetic waves, which are radiated from the surface including the slots, from propagating backward (from the right to the left in FIG. 9B) due to a diffraction phenomenon, by reflecting the part of the electromagnetic waves by the other side which is set longer. This simple structure makes it possible to narrow (or decrease) the range of the direction in which the radiant waves are radiated, and concurrently to inhibit the increase in the manufacturing costs. Similar to an embodiment of FIG. 12A (described later), the outer conductor 203 may be separated into two parallel conductors having the surface 203a and the surface 203b, respectively.

Third Embodiment

Next, descriptions will be provided for a leaky transmission line (leaky cable) according to a third embodiment of the present invention. FIGS. 10A and 10B show a leaky transmission line (leaky cable) 300 according to the third embodiment. The left part of FIG. 10A shows a transverse cross section of the leaky transmission line 300 taken along the line A-A of FIG. 10B perpendicular to the lengthwise direction of the leaky transmission line 300, and shows electric fields and magnetic fields by thin solid lines and dashed lines, respectively. The right part of FIG. 10A shows a distribution of electric current which flows in an outer conductor 303. FIG. 10B shows a longitudinal cross section of the leaky transmission line 300 taken in parallel to the lengthwise direction of the leaky transmission line 300. This drawing illustrates that the leaky transmission line 300 radiates electromagnetic waves from only one side on the widthwise axis of the leaky transmission line 300 (namely, to only the right in the drawing). Note, however, that as in the first embodiment, the leaky transmission line 300 may be configured to radiate electromagnetic waves on both the two sides.

As shown in FIG. 10A, the leaky transmission line 300 includes: two central conductors 301 each having a rectangular cross section; the outer conductor 303 surrounding the central conductors 301 and having a rectangular cross section for an electric signal transmission line; an insulator 302 disposed between the central conductor 301 and the outer conductor 303; and a sheath 306 (see also FIG. 10B) covering the outer conductor 303 (FIG. 10A). As shown in FIG. 10B, the outer conductor 303 is provided with two slot rows 307 and 308 each consisting of multiple slots 305 for forming leaky electromagnetic field, in one of surface (first surface) 303a and surface (second surface) 303b which include the respective long sides of the rectangular cross section. In the embodiment as shown in FIGS. 10A and 10B, the two slot rows 307 and 308 are provided in the surface 303a (FIG. 10A).

The characteristic of the leaky transmission line 300 according to this embodiment is that the leaky transmission line 300 includes multiple central conductors 301 (two central conductors 301 in FIG. 10A). As shown in FIG. 10A, the distribution of electric current flowing in the surfaces 303a and 303b of the outer conductor 303, has the highest electric current density in areas where the outer conductor 303 faces (or overlaps) the respective central conductors 301 as in the distribution of electric current according to the first embodiment. As shown in FIG. 10B, the slots 305 are formed in these areas where the electric current density is the highest. Accordingly, the leaky transmission line 300 is configured by the two slot rows 307 and 308. Further, a connector 359 is connected to the central conductors 301 to transmit or receive an electrical signal from the central conductors 301.

The leaky transmission line 300 according to this embodiment can make the radiation range of radiant waves (see FIG. 10A) wider, because as described above, the leaky transmission line 300 has the structure in which the outer conductor 303 is provided with the slots 305 in the areas facing the respective central conductors 301, to thereby have multiple slot rows 307, 308. When the leaky transmission line 300 according to this embodiment is applied to, for example, a communication environment in which communicating parties widely spread, it is possible to make the communication environment more suitable.

Fourth Embodiment

Next, descriptions will be provided for a leaky transmission line (leaky cable) according to a fourth embodiment of the present invention. FIG. 11A shows a leaky transmission line (leaky cable) 400 according to the fourth embodiment of the present invention. The left part of FIG. 11A shows a transverse cross section of the leaky transmission line 400 taken perpendicular to the lengthwise direction of the leaky transmission line 400, and shows electric fields and magnetic fields by thin solid lines and dashed lines, respectively. The right part of FIG. 11A shows a distribution of electric current which flows in an outer conductor 403. FIG. 11B shows a longitudinal cross section of the leaky transmission line 400 taken in parallel to the lengthwise direction of the leaky transmission line 400. These drawings illustrate that the leaky transmission line 400 which radiates electromagnetic waves from only one side on the widthwise axis of the leaky transmission line 400 (namely, to only the right in the drawing). Note, however, that as in the first embodiment, the leaky transmission line 400 may be configured to radiate electromagnetic waves on both sides.

As shown in FIGS. 11A and 11B, the leaky transmission line 400 includes: a wide central conductor 401 having a rectangular cross section; the outer conductor 403 surrounding the central conductor 401 and having a rectangular cross section for an electric signal transmission line; an insulator 402 disposed between the central conductor 401 and the outer conductor 403; and a sheath (casing) 406 covering the outer conductor 403, as shown in FIG. 11A. As shown in FIG. 11B, the outer conductor 403. (FIG. 11A) is provided with two slot rows 407 and 408 each consisting of multiple slots 405 for forming leaky electromagnetic field, in one of surface (first surface) 403a and surface (second surface) 403b (FIG. 11A) which include the respective long sides of the rectangular cross section. As shown in FIG. 11B, the slot rows 407 and 408 are provided only in the surface 403a. However, they may very well be provided on both surfaces 403a and 403b (not shown).

The characteristic of the leaky transmission line 400 according to this embodiment is that the central conductor 401 is wider. As shown in FIG. 11A, the distribution of electric current flowing in the surfaces 403a and 403b of the outer conductor 403, has the highest electric current density in an area where the outer conductor 403 faces (or overlaps) the central conductor 401. The multiple slot rows are formed in this area (such that the slots overlap/face the central conductor 401) where the electric current density is the highest. Accordingly, as shown in FIG. 11B, the leaky transmission line 400 is configured by including the two slot rows 407 and 408.

The leaky transmission line 400 according to this embodiment can make the radiation range of radiant waves (see FIG. 11A) wider, because as described above, the leaky transmission line 400 has the structure in which the outer conductor 403 is provided with the multiple slot rows 407, 408 in the area facing the central conductor 401 having the wider area. In short, with only a single central conductor 401, the leaky transmission line 400 according to this embodiment can obtain the same effect as the leaky transmission line 300 according to the third embodiment. As in the case of the third embodiment, when the leaky transmission line 400 according to this embodiment is applied to, for example, a communication environment in which communicating parties are widely spread, it is possible to make the communication environment more suitable.

Fifth Embodiment

Figure 15:
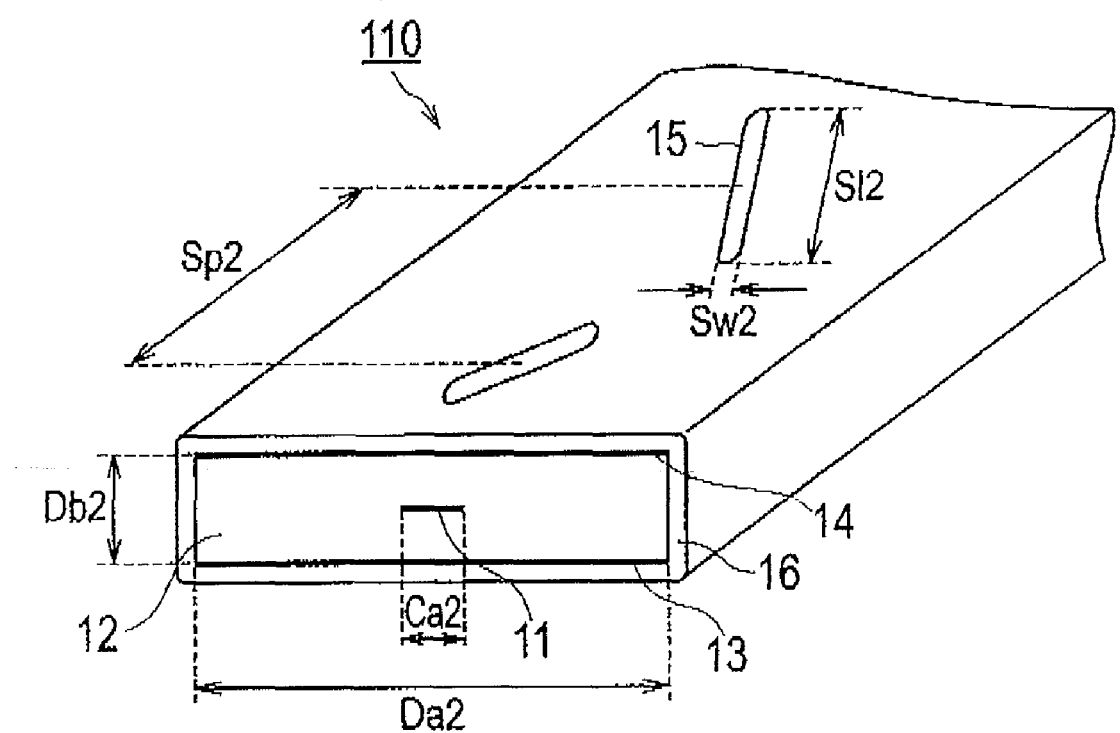
FIG. 15 is a perspective view of the leaky transmission line according to the fifth embodiment.

Next, descriptions will be provided for a leaky transmission line (leaky cable) according to a fifth embodiment of the present invention. FIG. 12A shows a leaky transmission line (leaky cable) 110 according to the fifth embodiment of the present invention. The left part of FIG. 12A shows a transverse cross section of the leaky transmission line 110 taken perpendicular to the lengthwise direction of the leaky transmission line 110, and shows electric fields and magnetic fields by thin solid lines and dashed lines, respectively. The right part of FIG. 12A shows a longitudinal cross section of the leaky transmission line 110 taken in parallel to the lengthwise direction of the leaky transmission line 110. The middle part of FIG. 12A shows a distribution of electric current which flows in an outer conductor 13. The slot row of FIG. 12A (or multiple slot rows of FIG. 12B) are formed where the electric current density is higher. FIG. 15 is a perspective view of the leaky transmission line 110. FIG. 12A illustrates that the leaky transmission line 110 radiates electromagnetic waves from only one side on the widthwise axis of the leaky transmission line 110 (namely, to only the right in the drawing). Note, however, that as in the first embodiment, the leaky transmission line 110 may be configured to radiate electromagnetic waves on both the aides.

As shown in FIGS. 12A and 12B and 15, the leaky transmission line (leaky cable) 110 includes: a central conductor 11 having a rectangular cross section; paired, plate-shaped outer conductors (first and second outer conductors) 13, 14 (FIG. 12A) sandwiching the central conductor 11 therebetween; an insulator 12 (FIG. 12A) disposed between the central conductor 11 and the outer conductors 13, 14; and a sheath (casing) 16 covering the outer conductors 13, 14. At least one of the paired outer conductors 13, 14 is provided with a row of multiple slots 15 for forming leaky electromagnetic field, the slots 15 being formed in the lengthwise direction of the outer conductor.

The slots 15 are provided to either or both of the paired outer conductors 13, 14 at periodic intervals (at slot intervals Sp2 (see FIG. 15)). FIGS. 12A and 15 exemplify a zigzag slot arrangement pattern which is generally used for leaky coaxial cables (LCXs). However, the slot arrangement pattern is not limited to such pattern. Any known electromagnetic field leaking mechanism which is used for leaky coaxial cables (LCXs) may be used. Similar to the leaky transmission line 400 as shown in FIG. 11B, the outer conductor 14 of the leaky transmission line 110 may include two slot rows 18 each consisting of multiple slots 15 for forming leaky electromagnetic field (see FIG. 12B).

Furthermore, no restriction is imposed on the geometric dimension of the paired outer conductors 13, 14 in the leaky transmission line 110 according to this embodiment, unlike the leaky transmission line 100 according to the first embodiment in which a restriction is imposed on the geometric dimension of the outer conductor 3 in a way that the length (Da1) of the long sides of the rectangular cross section of the outer conductor 3 should be less than a half of the wavelength λ of a transmitted electric signal. Instead, a restriction is imposed on the relative position relationship among the central conductor 11 and the paired outer conductors 13, 14 in a way that the central conductor 11 is placed in the middle between the paired outer conductors 13, 14. Referring to FIGS. 13 and 14A to 14C, descriptions will be provided for the reason why the restriction needs to be imposed on the relative position relationship among the central conductor 11 and the paired outer conductors 13, 14. As shown in FIGS. 12C and 12D, the outer conductor 13 may have a width wider than that of the outer conductor 14. Further, as shown in FIG. 12E, the central conductor 11 may have a circular cross section.

Figure 13:
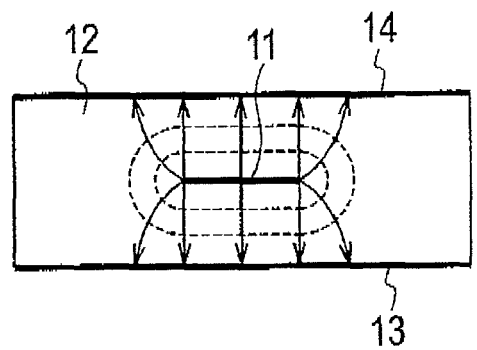
FIG. 13 shows a distribution of electromagnetic field which occurs in the leaky transmission line according to a fifth embodiment of the present invention.
Figure 14A:
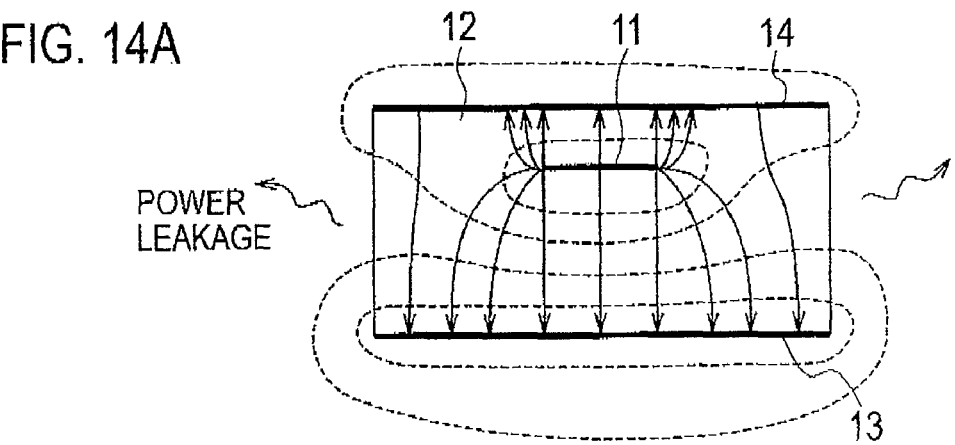
FIGS. 14A, 14B and 14C show a distribution of electromagnetic field which occurs when a central conductor is located off the center of the leaky transmission line according to the fifth embodiment.
Figure 14B:
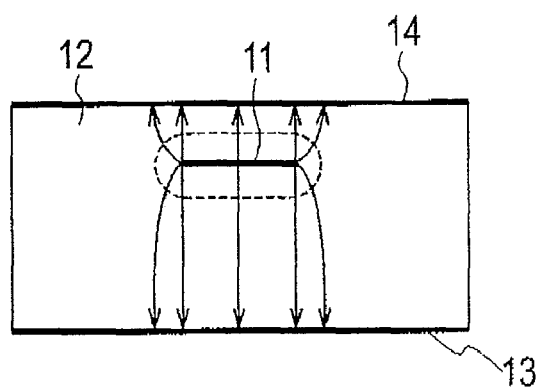
Figure 14C:
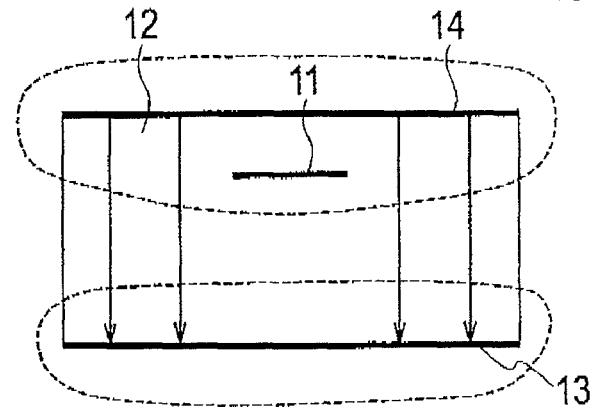

FIG. 13 shows a distribution of electromagnetic field which occurs when the central conductor 11 is placed in the middle between the outer conductors 13, 14 (with the distance between the central conductor 11 and the outer conductor 13 being equal to the distance between the central conductor 11 and the outer conductor 14). In addition, FIGS. 14A, 14B and 14C show a distribution of electromagnetic field which occurs when a central conductor 11 is located off the center of the leaky transmission line 110. In these figures, electric fields and magnetic fields are indicated by thin solid lines and dashed lines, respectively. As shown in FIG. 13, lines of electric force from the central conductor 11 to the upper outer conductor 14 and lines of electric force from the central conductor 11 to the lower outer conductor 13 have the same distribution and are directed diametrically opposite to each other, and accordingly, cancel out each other. Consequently, no electromagnetic waves leak in the widthwise direction of the leaky transmission line 110 (namely, in a direction at a right angle to the leaky transmission line 110).

However, in such a case as shown in FIG. 14A, where the central conductor 11 is placed not in the middle between the paired outer conductors 13, 14, but closer to the outer conductor 14, the lines of electric force directed to the outer conductor 13 and the lines of electric force directed to the outer conductor 14 are still directed diametrically opposite to each other, but do not have the same distribution. To put it specifically, the lines of electric force directed from the central conductor 11 to the upper outer conductor 14 and the lines of electric force directed from the central conductor 11 to the lower outer conductor 13 are distributed as shown in FIG. 14B. In addition, as shown in FIG. 14C, there are lines of electric force directed from the central conductor 11 and the outer conductor 14 to the outer conductor 13 because the central conductor 11 is placed closer to the outer conductor 14.

Moreover, not only lines of magnetic force are distributed around the central conductor 11 (see FIG. 14B), but also lines of magnetic force are distributed around each of the upper and lower outer conductors 14, 13 (see FIG. 14C). This causes a mode in which each of the upper outer conductor 14 and the lower outer conductor 13 is turned into a transmission line. As a result, as depicted by wavy lines as power leakage in FIG. 14A, electromagnetic waves leak outward from the insulator 12 in the widthwise direction of the leaky transmission line 110 (as depicted by wavy lines. The leak increases the attenuation of the transmitted electric signal. Furthermore, as the attenuation becomes larger, the radiant power from each slot decreases. This deteriorates the quality of the leaky transmission line.

In short, when the central conductor 11 is placed in the middle between the paired outer conductors 13, 14, it is possible to prevent electromagnetic waves from leaking in the widthwise direction of the leaky transmission line 110. However, it is difficult to place the central conductor 11 in the middle position between the outer conductors 13, 14 precisely, because of inequality in the dimensional precision and dielectric constant of the insulator 12 and the degree of flatness of the outer conductors 13, 14 (in FIGS. 13, 14A to 14C).

The following point should be noted. It is desirable that, also in the leaky transmission line 100 according to the first embodiment, the central conductor 1 should be placed in the middle between the long sides of the rectangular cross section as in this embodiment. However, the central conductor 1 does not have to be placed in the true middle. To put it specifically, in the leaky transmission line 100 according to the first embodiment, the outer conductor 3 is configured as if by integrating the outer conductors 13, 14 into a single unit with the outer conductors 13, 14 being short-circuited at the sides of the leaky transmission line 100. This configuration makes it possible to prevent electromagnetic waves from leaking in the widthwise direction of the leaky transmission line 100 wastefully.

Next as shown in FIG. 15, descriptions will be provided for how to measure the amount of radiation leakage from the leaky transmission line 110 according to this embodiment and the result of the measurement. The leaky transmission line 110 to be used for the measurement was produced experimentally as follows. A piece of copper tape with a width Ca2 of 3 mm and with a thickness of 0.1 mm was used as the central conductor 11. This piece of copper tape (constituting the central conductor 11) was interposed between two pieces of polyethylene (constituting the insulator 12) each with a thickness of 2 mm and with a width Da2 of 19 mm. Subsequently, another pieces of copper tape (constituting the outer conductors 13, 14) each with a width Da2 of 19 mm and with a thickness of 0.2 mm were adhered to the respective outer surfaces of the resultant product. The combined members were heated and thus welded together so that the combined members would not separate from each other. Thereafter, the resultant combined members were covered with the sheath 16 to protect the outer conductors 13, 14.

As in the first embodiment, the leaky transmission line 110 experimentally produced was designed with a characteristic impedance of 50Ω. In addition, the width Ca2 of the central conductor 11, the thickness of the central conductor 11, the thickness Db2 of the insulator 12 and the like were found by applying the impedance of 50Ω and the dielectric constant (2.3 in the case of polyethylene) of the insulator 12 to the calculated value which was disclosed in Non-patent Document 2.

Note that the slots each with a width Sw2 of 2 mm and with a length S12 of 15 mm, which were designed to be formed in the outer conductor 13 at periodic intervals (at slot intervals Sp2), were set in the respective locations facing the central conductor 11 for the purpose of making the radiation from each slot efficient. In addition, the leaky transmission line 110 experimentally produced was 3 m in length. The entire leaky transmission line 110 was fixed securely by screwing the leaky transmission line 110 at its end portions positioned along a direction perpendicular to the lengthwise direction (see screws denoted by 17 in the right part of FIG. 12).

The amount of radiation leakage from the leaky transmission line 110 was measured by use of the system, used in the first embodiment, for measuring the amount of radiation leakage (see FIG. 7A). The measurement result obtained was almost identical to the amount of radiation leakage from the leaky transmission line 100 according to the first embodiment (see FIG. 7B).

As described above, the leaky transmission line (leaky cable) 110 according to this embodiment includes: the central conductor 11 having a rectangle cross section; the plate-shaped paired outer conductors 13, 14 sandwiching the central conductor 11 therebetween and at least one of which being provided, in the lengthwise direction, with a row of the multiple slots 15 for forming leaky electromagnetic field; the insulator 12 disposed between the central conductor 11 and the outer conductors 13, 14; and the sheath (casing) 16 covering the outer conductors 13, 14. The central conductor 11 is placed in the middle between the paired outer conductors 13, 14.

Any leaky transmission line, in which the central conductor 11 is not located in the middle, may be incapable of performing a stable radiation. That is because: transmission modes occur in which the outer conductors 13, 14 are turned into transmission lines; electromagnetic waves hence leak outward between the outer conductors 13, 14; and the attenuation accordingly increases. The leaky transmission line 110 according to this embodiment, on the other hand, can become a high-quality leaky transmission line. That is because the leaky transmission line 110 has the structure in which the central conductor 11 is placed in the middle between the paired outer conductors 13, 14. This structure enables the leaky transmission line 110 to prevent electromagnetic waves from leaking in the widthwise direction of the leaky transmission line 110, and accordingly inhibit the reduction in radiant power from each slot 15.

Furthermore, because the leaky transmission line 110 according to this embodiment has a rectangle cross section, it is possible to decrease the thickness of the leaky transmission line 110. For instance, although the leaky transmission line experimentally produced was already approximately 6 mm in thickness, it is possible to further reduce the thickness of the leaky transmission line 110 according to this embodiment by reducing the thickness of the insulator, by narrowing the width of the central conductor 11, or by decreasing the dielectric constant of the insulator 12. Moreover, because the structure of the leaky transmission line 110 according to this embodiment is made of the pieces of conductor (metal) tape and the insulator which overlap one another, the manufacturing method needs no expensive manufacturing machine such as an extruder. This makes it possible to inhibit the increase in the manufacturing costs.

Further, the leaky transmission line 110 according to this embodiment has a rectangle cross section and has the slots 15 in one flat surface of the outer conductor 13. For this reason, the surface including the slots 15 does not twist. Additionally, because the leaky transmission line 110 according to this embodiment is formed as a flat plate, it is possible to fix the locations of the slots 15 very easily. Furthermore, unlike the conventional leaky coaxial cable having a circular cross section, the leaky transmission line 110 has a simpler configuration which requires no complicated mechanism or additional step for preventing the twist. For this reason, it is possible to inhibit the increase in the manufacturing costs.

While novel features of the present disclosure have been particularly shown and described with reference to exemplary embodiments thereof, it will be understood by one of ordinary skill in the art that various changes in form and details may be made therein without departing from the spirit and scope of the present disclosure as defined by the following claims.

What is claimed is:

1. A leaky cable comprising:
   a central conductor;
   an outer conductor having a rectangular cross section and surrounding the central conductor, the outer conductor comprising first and second surfaces parallel to each other, and at least one slot row formed only in the first surface, the at least one slot row being formed in a lengthwise direction of the leaky cable, the at least one slot row comprises a plurality of slots each configured to form a leaky electromagnetic field, the second surface being configured to reflect a part of electromagnetic waves radiated from the first surface, the part of the electromagnetic waves being diffracted backward to the second surface;
   an insulator disposed between the central conductor and the outer conductor; and
   a sheath covering the outer conductor,
   wherein a width of the rectangular cross section in a direction parallel to the first and second surfaces is less than half of a wavelength of an electric signal transmitted through the leaky cable,
   wherein the second surface has a width in a transverse direction normal to the lengthwise direction, the width of the second surface is larger than a width of the first surface in a transverse direction normal to the lengthwise direction.

2. The leaky cable according to claim 1, wherein the central conductor has a cross section formed into one of a polygon and a circle.

3. The leaky cable according to claim 1, wherein the central conductor is spaced equally from the first and second surfaces.

4. The leaky cable according to claim 1, wherein the plurality of slots in the at least one slot row overlap the central conductor.

5. A leaky cable comprising:
   a central conductor;
   first and second outer conductors sandwiching the central conductor therebetween, only the first outer conductor including at least one slot row formed in a lengthwise direction of the leaky cable, the at least one slot row including a plurality of slots each configured to form a leaky electromagnetic field;
   an insulator disposed between the central conductor and each of the first and second outer conductors; and
   a sheath covering a circumference of the first outer conductor, the second outer conductor and the insulator,
   wherein the central conductor is located in an approximate middle region between the first and second outer conductors,
   wherein the first outer conductor has a width in a transverse direction normal to the lengthwise direction of the leaky cable, and the width of the first outer conductor is less than half of a wavelength of an electric signal transmitted through the leaky cable,
   wherein the second outer conductor has a width in the transverse direction normal to the lengthwise direction, and the width of the second outer conductor is larger than the width of the first outer conductor, the second outer conductor being configured to reflect a part of electromagnetic waves radiated from the first outer conductor, the part of the electromagnetic waves being diffracted backward to the second outer conductor.

6. The leaky cable according to claim 5, wherein the central conductor has a cross section formed into one of a polygon and a circle.

7. The leaky cable according to claim 5, wherein the first and second outer conductors are each formed as a flat plate.

8. The leaky cable according to claim 5, wherein the plurality of slots in the at least one slot row overlap the central conductor.

* * * * *